United States Patent [19]
Cycowicz et al.

[11] 3,989,298
[45] Nov. 2, 1976

[54] SEATING FURNITURE AND HARDWARE THEREFOR
[75] Inventors: Izchak Cycowicz, Brooklyn; Alfred Frimmet, Larchmont, both of N.Y.
[73] Assignee: Mohasco Corporation, Amsterdam, N.Y.
[22] Filed: Oct. 2, 1975
[21] Appl. No.: 618,955

[52] U.S. Cl. ............................. 297/342; 297/317; 297/443; 297/450
[51] Int. Cl.² ......................................... A47C 1/02
[58] Field of Search ................. 16/DIG. 40; 108/64; 297/248, 317, 318, 322, 341–343, 443, 444, 450; 403/377, 378

[56] References Cited
UNITED STATES PATENTS
1,928,857 10/1933 Kelly ................................... 297/343
2,650,656 9/1953 Ohlsson .......................... 297/443 X

*Primary Examiner*—James C. Mitchell
*Attorney, Agent, or Firm*—J. B. Felshin

[57] ABSTRACT

The seating furniture comprises a seat part and a back part disconnectably connected thereto in condition for use and to allow the furniture to be packed more compactly by the manufacturer for shipment to the retailer with the back part disconnected from the seat part and overlying the seat part. The furniture may be either a club chair or sofa or a rester or a lounger. The hardware comprises a mounting member connected to one of said furniture parts slidably received in a slot or channel or passage in a channel forming member connected to the other of said furniture parts, and having a resilient tongue adapted to snap into a hole in said mounting member, to limit relative sliding movement between said mounting member and channel forming member to hold said furniture parts in assembled condition for display or use. Said furniture parts can thus be assembled by the retailer when received in disconnected condition from the manufacturer. The back part can be disassembled from the seat part by prying the tongue out of the hole in the mounting member to allow the back part to again be pulled away from and disconnected the seat part.

13 Claims, 11 Drawing Figures

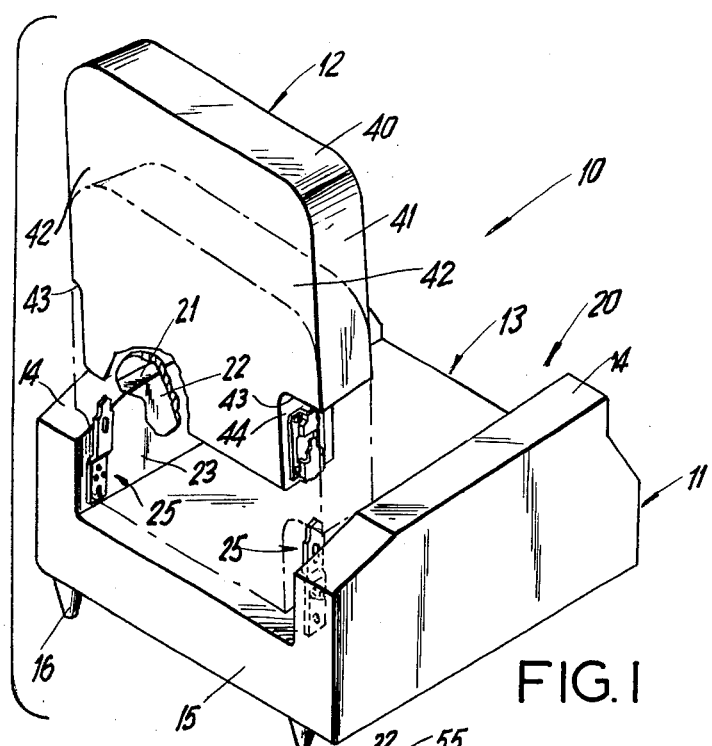
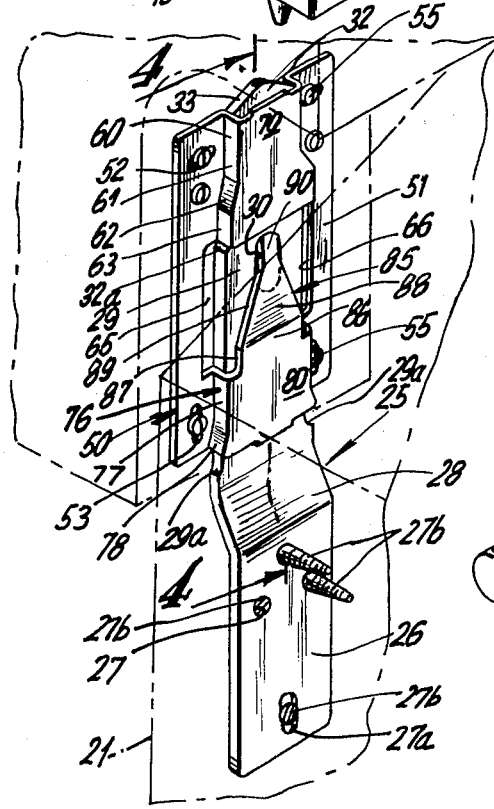
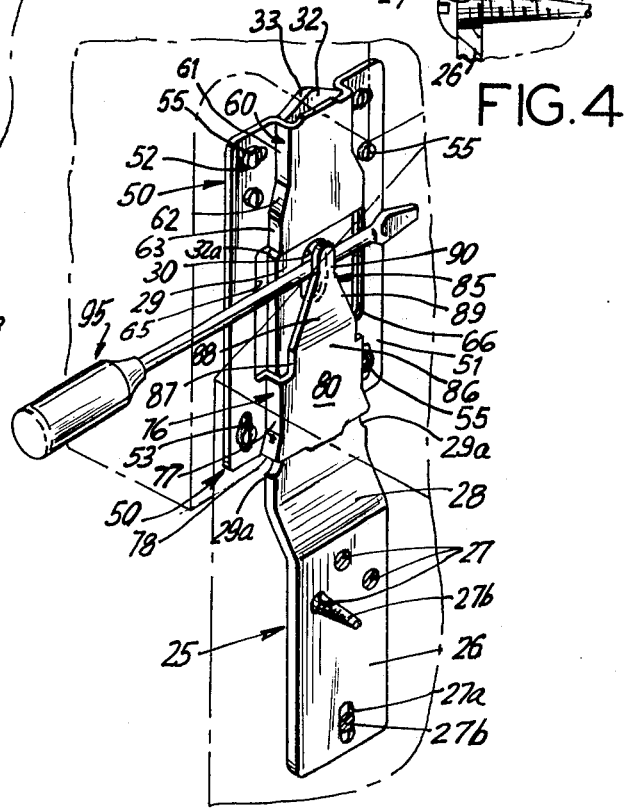

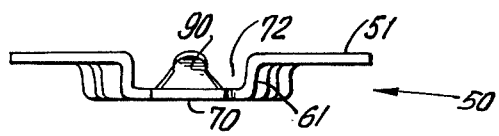
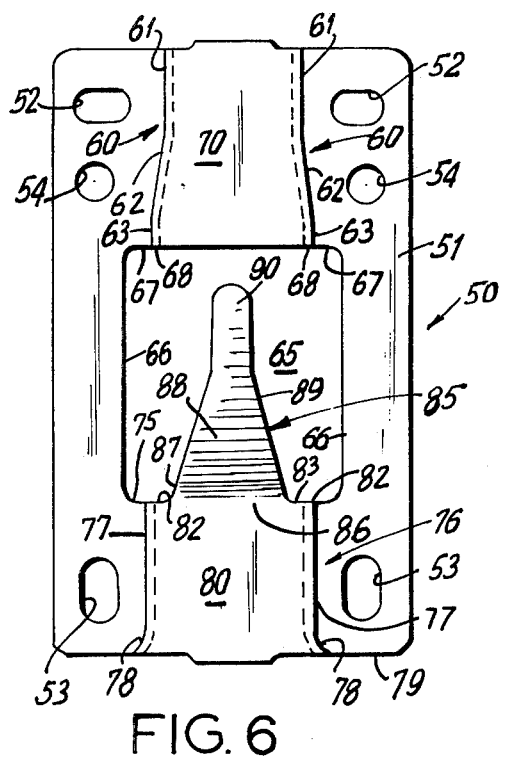
FIG. 5
FIG. 6
FIG. 7
FIG. 8
FIG. 9

SEATING FURNITURE AND HARDWARE THEREFOR

This invention relates to seating furniture such as chairs or sofas of the club, rester or lounger types. One difficulty in such furniture has been that the back parts were permanently connected by the manufacturer to the seat parts in position for display or use by the retailer, in assembled condition. This procedure produced very bulky pieces of furniture that could not be shipped compactly. This is so because the back part is upright and extends upwardly from the rear of the seat base, either rigidly as in case of a club chair or tiltably as in case of a rester or a lounger. In either case, the packaging of such pieces of furniture resulted in very bulky packages that were hard to handle and necessitated larger packing cases and expensive to ship.

It is hence an object of this invention to provide seating furniture of the character described, and hardware therefor, which will obviate the above mentioned difficulties by allowing the back part of the piece of seating furniture to be packed in overlying position on the seat part, disconnected from the seat part, for more compact shipment by the manufacturer to a retailer who then can assemble the back part to the seat part in condition for display or use.

Another object of this invention is to provide hardware for a piece of seating furniture of the character described comprising a mounting member connected to one of said furniture parts and having a shank slidably and non-rotatably fitted into a passage in a channel forming member connected to the other of said furniture parts, and having a spring tongue adapted to snap into a hole in said shank to hold the furniture parts in assembled condition for display or use.

Still another object of this invention is to provide hardware for a piece of furniture of the character described in which said tongue can be pried out of the hole in the shank by a blade or screw driver or like instrument, to allow the back part of the furniture to be disconnected from the seat part and allow said parts to be arranged in overlying relative position, compactly for shipment or storage.

A further object of this invention is to provide a strong, rugged and durable piece of furniture of the character described, which may be embodied in a club, rester or lounger type chair or sofa, and hardware therefor, which shall be relatively inexpensive to manufacture, easy to assemble and disassemble, and which shall be easy to handle, pack and ship and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

IN THE DRAWINGS

FIG. 1 is a rear perspective view of a club chair embodying the invention and showing the chair back part of the chair in full lines raised above the seat part;

FIG. 2 is a perspective view of the hardware on the near side of the chair of FIG. 1, in the assembled position of the chair back part and seat part;

FIG. 3 is a view similar to FIG. 2, but showing the locking tongue of the channel forming member pried out of the opening in the shank of the mounting member, by a screwdriver, to allow the chair back to be separated from the seat of the chair;

FIG. 4 is an enlarged cross-sectional view taken on line 4—4 of FIG. 2;

FIG. 5 is a top plan view of the channel forming member, by itself, of FIGS. 1–4;

FIG. 6 is a front elevational view of the channel forming member shown in FIG. 5;

FIG. 7 is a side elevational view of the channel forming member of FIG. 6;

FIG. 8 is a side elevational view of the mounting member of FIGS. 1–4;

FIG. 9 is a front elevational view of the mounting member of FIG. 1–4 and 8;

Figures 10, 11:
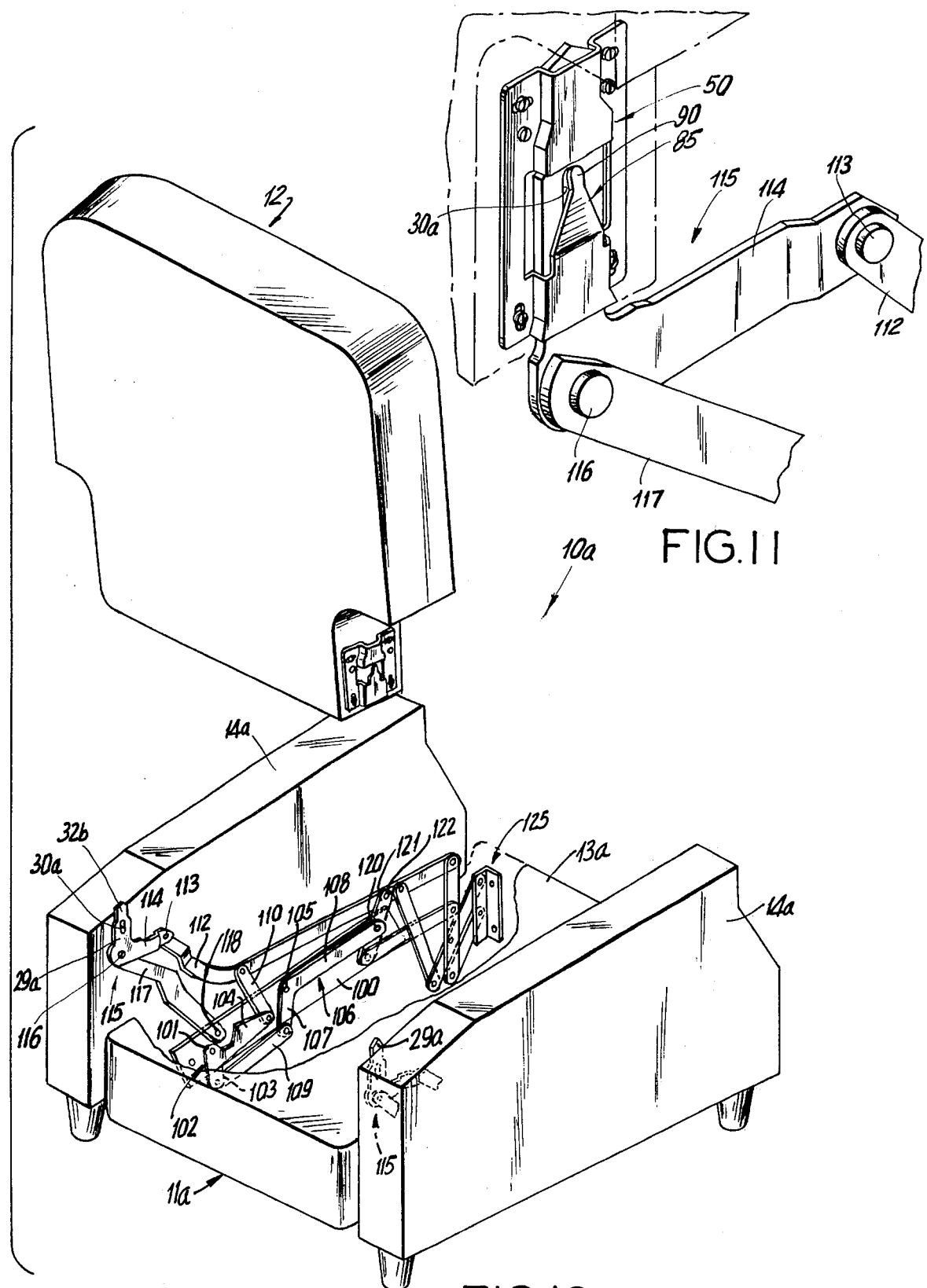
FIG. 10 is a rear perspective view of a lounger type chair embodying the invention but showing the chair back disassembled from and disposed above the seat base.
FIG. 11 is an enlarged perspective view of part of the hardware used in the chair illustrated in FIG. 4.

Referring now in detail to FIGS. 1 to 9 of the drawing, numeral 10 designates a club type chair embodying the invention and comprising a chair seat base part 11 and a chair back part 12. The seat base part 11 comprises a usual chair seat 13 and chair side arms 14 which extend up above the level of the seat 13 at opposite sides of the chair. The seat and side arms are fixed to the base in a club type chair or sofa.

In the drawing, numeral 15 designates the rear end of the base 11 and numeral 16 designates chair feet for supporting the base. Chair arms 14 have inner parallel vertical sides 20 which may comprise vertical wood boards, walls or slats 21 having an inner vertical surface 22 covered by upholstery fabric 23 of usual construction.

At each of the inner sides 20 of the chair side arms 14, there is attached a vertically extending back mounting metal member 25. Said back mounting members are similar and symmetrically disposed. Each of said back mounting members 25 has a lower, vertical downwardly extending flat arm 26 formed with an upper plurality of round holes 27 and with a lower vertical slot 27a, to receive screws 27b or other fasteners for attaching said member 25 to wood wall 21 of an arm 14 of the chair. Extending inwardly and upwardly from the upper end of arm 26 is an offset or bent portion 28 from which there extends upwardly, a vertical shank 29 of lesser width than arm 26 and bend 28. Said shank 29 is formed with a central vertical slot 30. Shank 29 has upper side shoulders 29a and is centered with respect to portions 26, 28. At the upper end of shank 29 is a reduced shank portion 32 disposed above slot 30 and of lesser width than shank 29, but centered with respect thereto and providing undershoulders 32a. The upper end of shank portion 32 has an upper inverted V-shaped edge 33.

The upper ends of back mounting members 25 project above side arms 14 as shown in FIG. 1 of the drawing.

The chair back 12 may be upholstered. It has an upper end edge 40 from which sides edges 41 extend downwardly. The lower ends of the sides of the chair back are recessed inwardly, as shown in FIG. 1, to produce upper, side wings 42 having undershoulders 43 and inner recessed vertical surfaces 44. At the insides of surfaces 44 are wood boards or walls not shown. The chair back may be covered by upholstery cloth in the usual manner, which cloth may or may not cover the wood boards at the inner sides 44 of the chair back.

Attached to said boards (not shown) at the inner surfaces 44 of the chair back 12, are similar, symmetrical channel forming members 50. Each member 50 comprises side flanges 51 in the same plane formed with upper horizontal slots 52, lower vertical slots 53 and round holes 54. All these holes and slots may receive screws or other fasteners 55 for screwing members 50 to the wood boards at surfaces 44 of the chair back 12, and to allow for up, down and side adjustment of the position of said members 50 to accomodate the upper ends of the back mounting members 25, as will appear hereinafter.

Extending from the inner sides of the flanges 51, at right angles thereto are similar, symmetrical upper side walls 60 at right angles to the plane of said flanges and having upper vertical portions 61 closer together. Extending down from portions 61 are portions 62 which taper downwardly away from each other. Extending down from portions 62 are vertical portions 63 spread further apart than portions 61. Said channel forming member 50 has a cut-out 65 forming inner side edges 66 spaced outwardly of side wall portions 63 and forming undershoulders 67 in flanges 51 and lower edges 68 at the lower ends of side walls 60.

Walls 60 are connected by a web 70 parallel to and spaced outwardly of the flanges 51. Side walls 60 and web 70 form a passage or channel 72 with surface 44, deep enough to accommodate the upper shank portion 32 of the back mounting member 25. The wall portions 61 are spread apart far enough to also accommodate the portion 32 of said member 25. When the upper portion 32 enters the channel, as will appear hereinafter, shoulders 68 may strike shoulders 32a to stop relative vertical movement between the back mounting member and the channel forming member. The tapered portion of the channel between side wall portions 62 and between the side wall portions 63 facilitate and guide entry of the portion 32 of the back mounting member 25 into the channel.

At the lower ends of said side edges 66 of said cut out 65 are inwardly extending shoulders 75. Extending outwardly from said flanges 51 are lower side walls 76 having vertical parallel portions 77, the lower ends of which curve outwardly and downwardly as at 78 and terminate in lower edges 79. The side walls 76 are interconnected by a web 80 in the plane of web 70, to form a lower channel 81 of same depth as channel 72. However wall portions 77 are spaced further apart sufficiently to allow shank portion 29 to enter said channel 81. The shoulders 29a of member 25 may strike side walls 78 to limit upward movement of member 25 relative to member 50.

The side walls 77 have upper edges 82 at the level of shoulders 75. The web 80 has upper end edges 83 also at the level of shoulders 75.

Extending up from the web 80 and between the edges 83 is a tongue 85 having a lower end portion 86 formed with upwardly and inwardly tapering side edges 87, a portion 88 inclined upwardly toward the plane of flanges 51 and having tapering side edges 89 which are extensions of edges 87, and an upper narrow lip 90 of reduced uniform width, the upper end of which is located below edges 67. The upper end of tongue 85 is normally in the plane of flanges 51 as shown in FIG. 7, and hence in the channel 72.

To attach the chair back to the seat base and seat, the chair back is moved down from he full line position of FIG. 1 to the dot-dash position of said figure. The distance between surfaces 44 is such that as the chair back is moved down, the shanks of the two back mounting members 25 will enter and slide up the channels 81, then they will flex the tongues 85 into the plane of webs 80, 70. As the back mounting members move up to a level where the lips 90 register with slots 30, the tongues which are resilient, will snap into said slots to substantially the position they occupied before portions 32 of the back mounting members 25 flexed the tongues outwardly. The tongues 85 are resilient and may be flexed.

Downward movement of the chair back is limited by shoulders 32a striking edges 68 or shoulders 29a striking shoulders 78. At this time, the lips 90 are within slots 30, and if an attempt is made to lift the chair back up in an effort to disconnect the chair back from the seat base, the upper edges of lips 90 will strike the upper edges of slots 30 to prevent the disconnection.

The thickness of portion 29 of member 25 is less than the depth of the channels 72, 81, so that there is some space between the portions 29, 32 and webs 80, 70. A screw driver 95 or blade of a dull knife or other suitable instrument can be wedged into such space to pry the tongue 85 to the full line position of FIG. 4 and out of slots 30 to allow the chair back to be lifted up off the seat base, if desired. This may be done for testing purpose.

While FIGS. 1 to 9 illustrate the invention embodied in a club chair, it will be understood that the invention can also be embodied in a rester type chair or sofa. In such case, back mounting members 25 are attached to seats which are tiltably hinged to a chair base, so that when the chair back is mounted onto the back mounting members, the seat and back can swing together. Yet the back can be disconnected and laid over the seat for compact shipment.

In FIGS. 10 and 11 there is shown a lounger type chair embodying the invention. In a lounger, the chair back is swingable relative to the seat and base and the seat is tiltable relative to the seat base or side arms.

In FIGS. 10 and 11, the chair back 12 is the same as in FIG. 1 and carries the channel forming members 50 in the same way as in said FIG. 1.

In FIG. 10, the chair 10a comprises a seat base 11a provided with fixed side arms 14a. Fixed to the side arms 14a, in any suitable manner, for example as shown in U.S. Pat. No. 3,185,520 granted May 25, 1965, is a support plate 100. The hardware for one side only of the chair is shown in FIG. 10 and will be described, since the hardware on both sides are similar and symmetrically disposed. The hardware is by way of example. Pivoted to bracket 100 as at 101 is a rear bellcrank 102 provided with a downwardly extending arm 103 and a forwardly extending arm 104. Also pivoted to said bracket 100, as at 105, is a forward bellcrank 106 having a downwardly extending arm 107 and a forwardly extending arm 108. The lower ends of arms 103 and 107 are interconnected by a link 109. Pivoted to the forward end of arm 104 is a link 110 pivoted at its upper end to seat link 111 fixed to the seat 13a on the seat base of the chair. Seat link 111 has a rearwardly and upwardly extending arm 112 pivoted as at 113 to the foward end of an arm 114 of a bellcrank shaped back mounting member 115. Said member 115 is pivoted as at 116 to the upper end of a link 117, the lower end of which is pivoted as at 118, to the rear end of bracket 100.

Pivoted to the front end of arm 108 of bellcrank 106, as at 120, is an intermediate portion of a link 121. Link 121 is pivoted at its upper end, as at 122, to the seat link 111. Legrest linkage 125 of usual type is connected to the lower end of link 121 and to said seat link. The above described hardware permits the seat 13a to tilt upward and backward while the leg rest is projected, in the well known manner.

Said bellcrank shaped back mounting member 115 has an upwardly projecting shank 29a formed with a slot 30a similar to shank 29 and slot 30 of FIGS. 1–9. Extending up from shank 29a is a reduced shank portion 32b similar to reduced portion 32 of FIGS. 1–9. The shanks 29a, 32b are received in the channel forming member 50 shown in FIGS. 10 and 11, in the same manner that shanks 29, 32 are received in channel forming members of FIGS. 1–9. Here again the tongue 85 snaps into the slot 30a of shank 29a to engage the upper end of the slot to prevent the chair back to be disconnected.

The tongues 85 of both channel forming members can be pried or flexed open and held open concurrently by a screw driver or other instrument 95 to allow the chair back to be pulled up or raised and disconnected from the chair base. After disconnection, the instruments 95 can be removed to allow the tongues to snap back into the channels formed by said members 50. Thereafter the chair back can be remounted in the manner described above.

It will be understood that when the chair back is disconnected it can be laid over the seat 13a for compact packing, storing and shipment.

When connected, the chair back can tilt backwards through one angle from upright to reclined positions as the seat is swung up to a different angle and the leg rest is projected.

Of course the chair back can be swung back to upright position as the seat is moved back to horizontal position and the leg rest is retracted, in the well known manner.

When the invention is embodied in a rester type chair or sofa, a back mounting member like member 25, may be fixed either to a seat link like seat link 111 of FIG. 10, fixed to a seat like seat 13a pivoted to the base 11a, or fixed to a seat link connected to the bracket 100 fixed to the base 11a, and to the leg rest of FIG. 10, by linkages such as illustrated in said figure.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

We claim:

1. Hardware for seating furniture comprising a seat base part and a back part, said hardware comprising a back part mounting member adapted to be connected to the seat base part, a channel forming member adapted to be attached to the back part, said back part mounting member having a shank provided with parallel edges slidably receivable in the channel formed by said channel forming member, said channel forming member having a web wall interconnecting parallel side walls slidably engaging said parallel edges of said shank, said shank having an opening, and said web wall of said channel forming member being formed with a cut out and having a spring tongue cut from the said web wall and projecting into said cut out and normally disposed in said channel, and in the path of said shank when said shank is slid into said channel, and said tongue having a lip portion adapted to be flexed back out of said channel as said shank is slidably moved in said channel into contact with the tongue in said channel, and the lip portion of said tongue which is flexed back out of the channel being adapted to snap back into said opening in said shank, to be again disposed in normal condition in said channel, and said lip portion of said tongue having an edge adapted to contact an edge of said opening in said shank, to prevent said channel forming member from being pulled off said back part mounting member.

2. The combination of claim 1, said shank being of less thickness than the depth of said channel whereby an instrument may be inserted between the snapped back tongue and said shank, to pry said tongue out of said opening and out of said channel, to allow said channel forming member to be pulled off said shank.

3. The combination of claim 1, said channel forming member and back part mounting member having stop means mutually interengageable when the shank is inserted into said channel, to limit insertion of said shank into said channel.

4. The combination of claim 3, said means being positioned to stop insertion of said shank into said channel in a position where said tongue can snap into said opening in said shank.

5. The combination of claim 1, a seat base part, means to connect said back part mounting member to said seat base part, a back part, and means to attach said channel forming member to said back part.

6. The combination of claim 5, and said back part mounting member being fixedly connected to said seat base part.

7. The combination of claim 1, a seat base part, a back part, and means to attach said channel forming member to said back part, and means to swingably connect said back part mounting member to said seat base part.

8. The combination of claim 1, a chair seat, means to connect said back part mounting member to said seat, a back part, and means to attach said channel forming member to said back part, a seat base part, means for swingably mounting said chair seat to said seat base part, and means to fixedly attach said back mounting member to said chair seat.

9. The combination of claim 1, the channel in said channel forming member being of a depth greater than the thickness of said shank.

10. The combination of claim 1, said channel forming member comprising, coplanar side flanges, said side walls comprising upper side wall portions extending from the inner ends of said side flanges, and lower side walls extending from said flanges to form a lower channel spaced below said upper channel.

11. The combination of claim 10, said upper side walls being closer together than said lower side walls, and said shank having an upper narrower portion receivable in the upper channel and a wider lower portion receivable in said lower channel.

12. The combination of claim 11, said channel forming member having undershoulders, said shank having shoulders adapted to engage said undershoulders on said channel forming members to limit movement of said shank relative to said channel forming member in one direction.

13. An article of seating furniture, comprising a seat part and a back part, and cooperative means on said parts to automatically lock said parts together upon moving said back part toward said seat part to a position in which the back part is normally in a position of use relative to the seat part, said lock means being releasable, said lock means comprising a member on one part forming a passage, and a shank on the other part slidably receivable in said passage, said member forming a passage being fixed to said back part and the shank receivable in said passage being connected to the seat part, said shank having an opening, and said passage forming member having a spring tongue normally in said passage but being retractable by said shank, out of said passage upon inserting said shank into said passage, and said tongue being adapted to snap into said opening in said shank when said back part and seat parts are in normal mutually correlated assembled relation for use, said tongue being disposed between and short of the ends of said member.

* * * * *